(12) United States Patent
McDuff et al.

(10) Patent No.: US 11,036,229 B2
(45) Date of Patent: Jun. 15, 2021

(54) SELF-DRIVING AUTONOMOUS VEHICLE AS BARRIER

(71) Applicant: INTERNATIONAL BUSINESS MACHINES CORPORATION, Armonk, NY (US)

(72) Inventors: Steve McDuff, Unionville (CA); Ben Z. Akselrod, Givat Shmuel (IL); Kyle D. Robeson, North York (CA); Anthony Di Loreto, Markham (CA)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 16/253,348

(22) Filed: Jan. 22, 2019

(65) Prior Publication Data
US 2020/0233419 A1    Jul. 23, 2020

(51) Int. Cl.
*G05D 1/02* (2020.01)
*E01F 13/04* (2006.01)

(52) U.S. Cl.
CPC ........... *G05D 1/0212* (2013.01); *E01F 13/04* (2013.01); *G05D 1/0287* (2013.01); *G05D 1/0276* (2013.01)

(58) Field of Classification Search
CPC .. G05D 1/0212; G05D 1/0276; G05D 1/0291; E01F 13/04; G08G 1/096741;
(Continued)

(56) References Cited

U.S. PATENT DOCUMENTS 7,217,061 B2   5/2007  Stratton
10,233,021 B1 * 3/2019  Brady .................. G05D 1/0282
(Continued)

FOREIGN PATENT DOCUMENTS

CN   204507045 U   7/2015
DE    19629676 A1  1/1998
WO  2017191649 A2 11/2017

OTHER PUBLICATIONS

Mell et al., "The NIST Definition of Cloud Computing", Recommendations of the National Institute of Standards and Technology, NIST Special Publication 800-145, Sep. 2011, 7 pages.
(Continued)

*Primary Examiner* — Michael J Zanelli
(74) *Attorney, Agent, or Firm* — Ewa M. Wozniak

(57) ABSTRACT

A method, computer system, and computer program product for using self-driving autonomous vehicles to form traffic barriers. The method may include receiving, by a processor, an identification of a location of an event. The method may identify a vehicle from an inventory of autonomous vehicles based on one or more criteria. The criteria may include a vehicle location criterion, a vehicle size criterion, a vehicle fuel criterion, or a vehicle availability criterion. The method may include transmitting to the vehicle an instruction to move to a first location. The method may include identifying a perimeter encompassing the location of the event. The method may include identifying a subset of vehicles in the first position and instructing the subset of vehicles to move to a second position. The method may include instructing the subset of vehicles in the second position to move back to the first position.

17 Claims, 8 Drawing Sheets

(58) Field of Classification Search
CPC ............. G08G 1/205; G08G 1/096775; G08G 1/096725; G08G 1/202
See application file for complete search history.

(56) References Cited

U.S. PATENT DOCUMENTS

| | | | |
|---|---|---|---|
| 2006/0259353 A1* | 11/2006 | Gutmann | ............... G06Q 10/02 |
| | | | 705/13 |
| 2010/0329781 A1 | 12/2010 | Conant | |
| 2016/0357183 A1* | 12/2016 | Shaw | ................... G05D 1/0027 |
| 2019/0035282 A1* | 1/2019 | Ferguson | .............. H04W 4/024 |

OTHER PUBLICATIONS

Singh et al., "Mechatronics Based Accident Alarming System with Automatic Roadblock Prevention System", SAE International, Technical Paper 2017-01-1728, Mar. 28, 2017, 3 pages, https://www.sae.org/publications/technical-papers/content/2017-01-1728/.

* cited by examiner

SELF-DRIVING AUTONOMOUS VEHICLE AS BARRIER

BACKGROUND

Embodiments of the present invention relate generally to a method, system and computer program for using self-driving autonomous vehicles to form traffic barriers.

There are many events which require the closing down of certain roads or intersections. These events may be planned in advance, such as a parade, or may occur dynamically, such as an accident. The closing down of the roads or intersections for the duration of the event may require barriers.

SUMMARY

An embodiment of the present invention may include a method, computer system, and computer program product for using self-driving autonomous vehicles to form traffic barriers. The method may include receiving, by a processor, an identification of a location of an event. The method may identify a vehicle from an inventory of autonomous vehicles based on one or more criteria. The criteria may include a vehicle location criterion, a vehicle size criterion, a vehicle fuel criterion, or a vehicle availability criterion. The method may include transmitting to the vehicle an instruction to move to a first location. The method may include identifying a perimeter encompassing the location of the event. The method may include identifying a subset of vehicles in the first position and instructing the subset of vehicles to move to a second position. The method may include instructing the subset of vehicles in the second position to move back to the first position.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Figure 1:
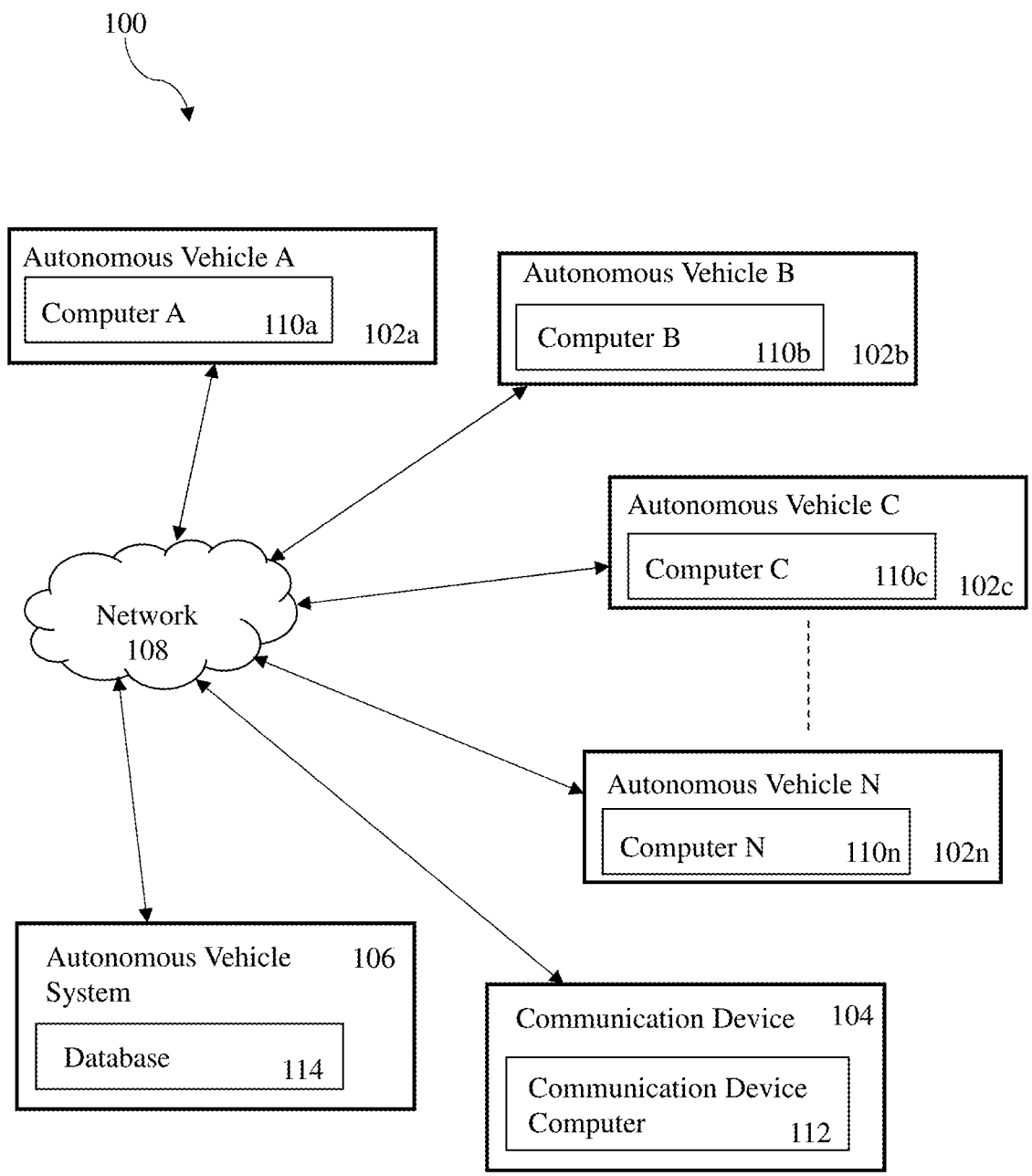
FIG. 1 is a schematic block diagram illustrating a system for using self-driving vehicles to form traffic barriers, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for using self-driving autonomous vehicles to form a traffic barrier. More particularly, the self-driving autonomous vehicles may be used to form traffic barriers around an event. The event may be preplanned. For example, the event may refer to a scheduled parade, demonstration, or construction. The event may also occur dynamically, for example an accident or a hazardous road condition. In both types of events, certain roads or road intersections may need to be closed off from traffic. The terms "road barrier" and "barrier" are used in this description for convenience. As the terms are used herein, it is not required that a road barrier or barrier be impenetrable. What is required is that a road barrier or barrier serve as a means to direct or divert traffic away from an event location, or to warn or alert traffic of an event.

Access to road barriers may be less of a problem when the event is preplanned and scheduled in advance. For example, the road barriers may be transported, in advance of the event occurrence, from their respective locations to the location of the event. However, even with preplanned events, running out of available barriers may be a problem. For example, if there are several events scheduled to occur simultaneously, where each event requires a certain number of barriers to be available, there may be a shortage of barriers. Further, access to road barriers may pose a concern during an unplanned event, such as an emergency situation caused by a vehicle accident. During an emergency situation, the barriers may need to be assembled as soon as possible. Access to road barriers at such a short notice may not be possible. Oftentimes, there may also be a limited number of barriers available. Further, even if the road barriers are available, they may be a distance away from the event. The travel time required to get the barriers from their respective locations to the event location may further add unnecessary delay. This lack of availability of barriers may delay the barrier assembly, causing traffic jams and other hazardous road conditions.

Embodiments of the present invention may allow for quick barrier assembly during any type of an event. For example, during a preplanned event such as a parade, the parade route may be known in advance allowing for road closures to occur before the event may start. An autonomous vehicle system may be used to select one or more self-driving autonomous vehicles and direct the selected self-driving autonomous vehicle to move to a location near the event occurrence. This may allow the autonomous vehicle system to use the self-driving autonomous vehicles as road barriers.

Embodiments of the present invention may also be useful in situations where the event is not preplanned but rather occurs dynamically, such as a vehicle accident or other emergency road conditions. Embodiments of the present invention may allow the autonomous vehicle system to access a database and select the self-driving autonomous vehicles that are located a short distance from the event occurrence. This may allow for the self-driving autonomous vehicles to quickly move to the locations determined by the autonomous vehicle system to form a barrier. In case of a vehicle accident in an intersection, a barrier may be formed to block access to the intersection. In case of a vehicle accident in a lane, a barrier may be formed to block access to the lane. In case of a vehicle parked on a road shoulder as a result of a breakdown, a barrier may be formed on the shoulder to alert traffic of the parked vehicle. The alert may include warning lights on an autonomous vehicle located on the road shoulder behind the broken-down vehicle. This may allow the event to be contained within that location and may prevent other potentially hazardous conditions from occurring. Embodiments of the present invention may also allow for effectively diverting traffic away from the event location, thus securing the event location.

Accordingly, at least some of the embodiments described herein provide a technical solution to the problems described above with respect to providing barriers during an event. As mentioned, problems may include a short supply of physical barriers and a need to rapidly put a physical barrier in place. The user of autonomous vehicles may expand the supply of physical barriers. However, there are also technical problems of knowing the identity of a pool of autonomous vehicles available for possible use in a barrier, knowing which autonomous vehicles in the pool are available a particular time, and knowing which autonomous vehicles are close to the event so that a physical barrier may be rapidly put in place. The computer system for using self-driving autonomous vehicles to form a traffic barrier solves these technical problems by automatically identifying which autonomous vehicles are available a particular time and are close to the event where they are needed. Further, the computer system automatically directs autonomous vehicles to the event location. Specifically, some embodiments described herein provide a method of using a self-driving autonomous vehicle to form a traffic barrier.

Reference will now be made in detail to the embodiments of the present invention, examples of which are illustrated in the accompanying drawings, wherein like reference numerals refer to like elements throughout. Embodiments of the invention are generally directed to using a self-driving autonomous vehicle to form a traffic barrier.

FIG. 1 illustrates a system 100 for using self-driving autonomous vehicles to form a traffic barrier, in accordance with an embodiment of the present invention. In an example embodiment, the system may include a plurality of autonomous vehicles 102a, 102b, 102c, 102n, a communication device 104, an autonomous vehicle system 106, all connected via one or more networks 108. Autonomous vehicles 102a, 102b, 102c, 102n may be self-driving vehicles and may each include a computer 110a, 110b, 110c, 110n, respectively. The communication device 104 may include a communication device computer. The autonomous vehicle system 106 may include a database 114. The autonomous vehicles 102, the communication device 104, and the autonomous vehicle system 106 may have computers with communication capabilities.

Owners of the self-driving autonomous vehicles 102 may register with the autonomous vehicle system 106 and give the autonomous vehicle system 106 access to use the self-driving autonomous vehicles 102 as barriers. The owners may be individuals who own singular self-driving autonomous vehicles 102. The owners may also refer to owners of a fleet of self-driving autonomous vehicles 102, such as owners of UBER®, LYFT®, or any other fleet of self-driving autonomous vehicles 102. The owners of a fleet of self-driving autonomous vehicles 102 may register its entire fleet for use by the autonomous vehicle system 106. Alternatively, the owners may specify which self-driving autonomous vehicle 102 to register with the autonomous vehicle system 106. The registration with the autonomous vehicle system 106 may take place when the owner is registering the self-driving autonomous vehicle 102 with the state-level government agency that administers vehicle registration. Alternatively, the owner may register the self-driving autonomous vehicle 102 at a later time, even after the self-driving autonomous vehicle 102 has been registered with the state-level government agency. An owner may exclude a vehicle from use as a barrier by not registering the vehicle.

During the registration process, the autonomous vehicle system 106, in its database 114, may collect and store information based on different criteria. The criteria may pertain to the physical characteristic of each autonomous vehicle 102. The database 114 may store information pertaining to the body style or body color or graphics. For example, during a snow storm, when there is a need to close down a certain road, the autonomous vehicle system 106 may pick an autonomous vehicle 102 with a bold body color, such as red or black, as opposed to an autonomous vehicle 102 with a pastel body color, such as white or beige. A red or black autonomous vehicle 102 may be more clearly visible during a snow storm and a white autonomous vehicle 102 may be more likely to blend in with the snow. In addition, an autonomous vehicle 102 may have certain graphics painted on its body. For example, the autonomous vehicle 102 may have the words EMERGENCY VEHICLE painted on its body. During an emergency situation, the autonomous vehicle system 106 may choose this autonomous vehicle 102 to form a barrier to alert people that a potential emergency may have occurred.

The database 114 may store information pertaining to the vehicle size, for example the body length or the body width of the autonomous vehicle 102. The body length may be used to determine how many autonomous vehicles 102 may be needed to form a barrier at a given event location. Depending on the length of the barrier needed, some situations may require that only one autonomous vehicle 102 may be needed. For example, a barrier may need to be formed to barricade a road that is 18 feet wide. The autonomous vehicle system 106 may look through the database 114 to find an autonomous vehicle 102 that is, for example, about 16 feet in length and may instruct that autonomous vehicle 102 to move to a first location to close off that road. However, if the road that needs to be closed off is 40 feet wide, the autonomous vehicle system 106 may choose an autonomous vehicle 102 that is longer, such as a bus with the body length of 35 feet. In such a situation, only one autonomous vehicle 102 may be used. However, if such a long autonomous vehicle 102 is not available, the autonomous vehicle system 106 may use two or more autonomous vehicles 102 of shorter body length to close off the road.

The database 114 may also store information pertaining to the availability of the autonomous vehicles 102. For example, certain autonomous vehicles 102 may not be available to be used as barriers during an event occurrence because they may have been already pre-booked. In those circumstances, the autonomous vehicle system 106 may choose other autonomous vehicles 102 that fit the barrier requirements and are available.

Although FIG. 1 shows four autonomous vehicles, autonomous vehicle 102a, autonomous vehicle 102b, autonomous vehicle 102c, and autonomous vehicle 102n, principles of an embodiment of the present invention are not restricted to four autonomous vehicles 102 and may be used with any number of autonomous vehicles 102. For example, an embodiment of the present invention may include only one autonomous vehicle 102, such as autonomous vehicle 102a. Another embodiment of the present invention may include multiple of autonomous vehicles 102, such as autonomous vehicle 102a, autonomous vehicle 102b, autonomous vehicle 102c, autonomous vehicle 102d, and autonomous vehicle 102e.

Further, an embodiment of the present invention is not limited to one communication device 104, as illustrated in FIG. 1, and may be used with any number of communication devices 104.

In the example embodiment, the network 108 is the Internet, representing a worldwide collection of networks and gateways to support communications between devices connected to the Internet. The network 108 may include, for example, wired, wireless, or fiber optic connections. In alternative embodiments, the network 108 may be implemented as an intranet, a local area network (LAN), or a wide area network (WAN). In general, the network 108 can be any combination of connections and protocols that will support communications between the autonomous vehicles 102, the communication device 104, and the autonomous vehicle system 106.

In an embodiment of the present invention, the communication devices 104 may be a mobile terminal, such as a smartphone, but is not limited to such. Other examples may include a user's laptop computer, tablet, desktop computer, or a peripheral device such as a smartwatch or other wearable device, or any programmable electronic device supporting the functionality required by one or more embodiments of the invention. The communication device computers 112 and the autonomous vehicle system 106 may be instances of the computer 1010 shown in FIG. 5. The communication device 104 may be used to communicate with the autonomous vehicle system 106 to request the use of the autonomous vehicle 102.

Figure 2:
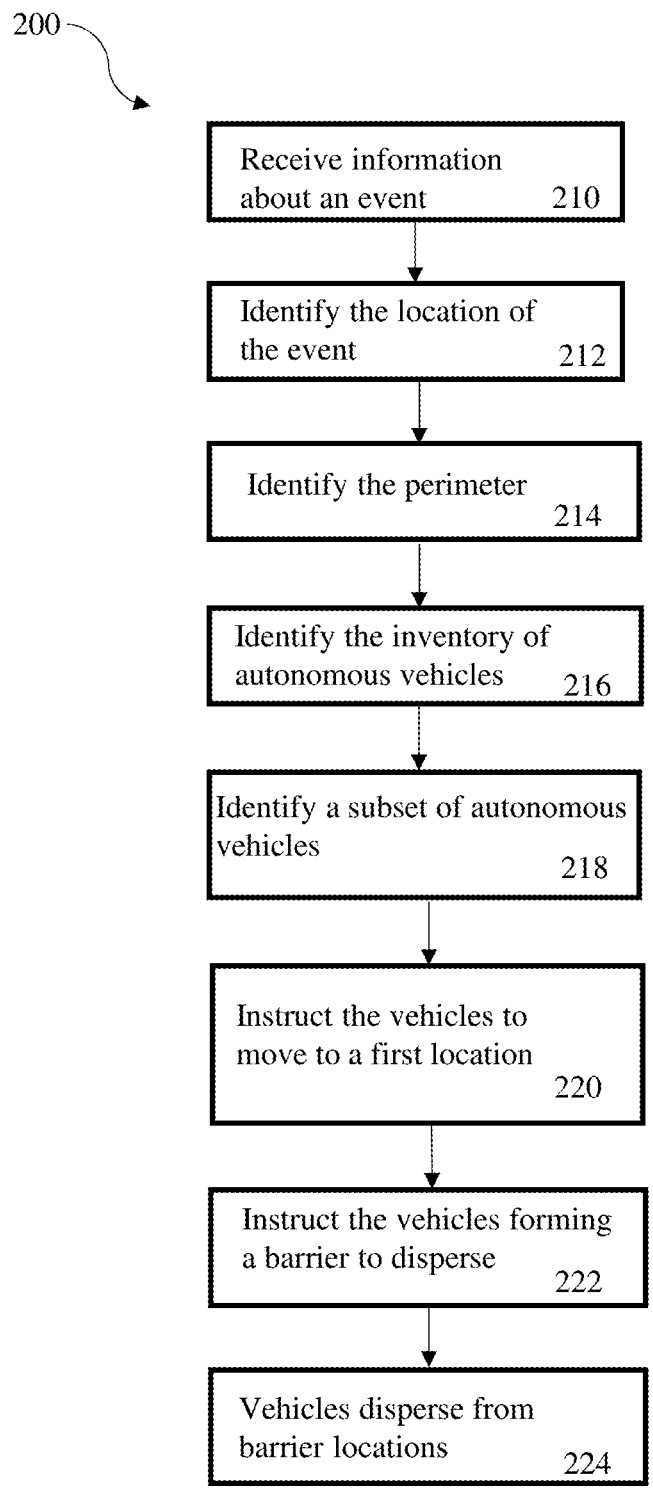
FIG. 2 is a flow chart illustrating an example method for using self-driving autonomous vehicles to form traffic barriers, in accordance with another embodiment of the invention.

Referring to FIG. 2, a method 200 for using the self-driving autonomous vehicles 102 to form barriers is depicted, in accordance with an embodiment of the present invention. Referring to operation 210, the autonomous vehicle system 106 receives information about an event. The information may be received from a user who may wish to deploy self-driving autonomous vehicles 102 to form barriers at an event location. Some examples of users who may wish to utilize autonomous vehicles 102 as barriers may include, but are not limited to, first responders such as police officers, firefighters, emergency medical professionals, or event planners why may be tasked with organizing planned events such as parades or demonstrations. The information may include details about the type of the event, such as an accident, a hazardous road condition, a parade, a demonstration, or any other event which may require the use of barriers. For example, if the information details a parade, the information may also provide details about the parade route length. Likewise, if the information specifies that the event is a hazardous road condition, additional details may include the length of the road that the hazardous condition extends.

Once the information about an event is received, the autonomous vehicle system 106, at operation 212, identifies the location of the event. For example, if the event is an accident, the autonomous vehicle system 106 may identify the stretch of the road or the intersection of the event occurrence.

Referring to operation 214, a security perimeter around the event is identified. The security perimeter may be a boundary that is set around the event. The security perimeter may be set a distance away from the event occurrence. For example, when the event is a vehicle accident at an intersection, the perimeter may be set around that intersection, within a distance of 15 feet from the accident.

In an example embodiment of the invention, the autonomous vehicle system 106 may identify the security perimeter. In an alternative embodiment of the present invention, the security perimeter may be identified by the user. Alternatively, the autonomous vehicle system 106 may suggest the security perimeter which may be approved or altered by the user.

Referring to operation 216, the autonomous vehicle system 106 identifies the inventory of the self-driving autonomous vehicles 102. The autonomous vehicle system 106 may determine the number of self-driving autonomous vehicles 102 that are available for deployment to the event location.

Referring to operation 218, the autonomous vehicle system 106 identifies a subset of autonomous vehicles 102 as candidate vehicles based on criteria. The autonomous vehicle system 106 may determine which autonomous vehicles 102 to identify by looking at different criteria. The criteria may be used to rank the identified subset of autonomous vehicles 102. The autonomous vehicle system 106 may rank the autonomous vehicles 102 based on the number of criteria the autonomous vehicles 102 satisfy. For example, the autonomous vehicle system 106 may assign a ranking score of 100 to the autonomous vehicles 102 that meet the desired criteria and a score of 0 to the autonomous vehicles 102 that do not meet any of the criteria. The higher the ranking score, the more criteria a given autonomous vehicle 102 may meet. Alternatively, the identifying of vehicles may include applying one of more filters to identify candidate vehicles from a pool of registered vehicles. The candidate vehicles may be a subset of the pool of registered vehicles. Filtering may be based on any suitable criteria, for example, may exclude vehicles in use or scheduled to be in use during the duration of the event. In some embodiments, a filter may be based on a vehicle size, fuel, or location criteria. In some embodiments in which one or more filters are employed, filtering first provides a list of candidate vehicles from the pool of registered vehicles and the candidate vehicles are then ranked according to one or more criteria. As one simplified example, filtering based on a vehicle availability criterion (vehicles in use or scheduled to be in use) may produce a list of candidate vehicles which are then ranked based on a vehicle location criterion (travel time or distance to the event).

The criteria may include information pertaining to the number of autonomous vehicles 102 needed to form the barrier at the event. The criteria may include the size of the autonomous vehicle 102, the signs, color, or external features of the autonomous vehicle 102 body, type of vehicle lighting, the distance between the autonomous vehicle 102 and the event location, the charge level or fuel status of the autonomous vehicle 102, advanced booking of the autonomous vehicle 102, or occupancy of the autonomous vehicle 102. For example, the autonomous vehicle system 106 may identify a particular autonomous vehicle 102 that it may want to utilize as a barrier. However, the autonomous vehicle system 106 identifies that that particular autonomous vehicle 102 is scheduled to pick up a passenger close to the time that the autonomous vehicle 102 would be needed to form the barrier. As a result, the autonomous vehicle system 106 may rank the identified autonomous vehicle 102 with a low score due to lack of availability. As a result, the autonomous vehicle system 106 may choose another autonomous vehicle 102 with a higher ranking score to be used during the event. As another example, a vehicle of a particular color or type of lighting may be given a higher score relative to other vehicles lacking these features on the basis that the color or lighting may provide a better visual alert to traffic.

The criteria listed herein are intended for illustrative purposes. Embodiments of the present invention may not be limited to the criteria listed herein. Additional criteria may be used to determine the appropriate candidate vehicles to be selected as candidate vehicles.

Referring to operation 220, the autonomous vehicle system 106 instructs the candidate autonomous vehicles 102 to move to a first location and park in a specific orientation. Each candidate autonomous vehicle 102 may be given instructions from the autonomous vehicle system 106 to move to a designated first location for that particular autonomous vehicle 102. For example, the autonomous vehicle system 106 determines that two candidate autonomous vehicles 102, autonomous vehicle 102a and autonomous vehicle 102b may be needed to form a barrier across King Street, between Avenues X and Y. The autonomous vehicle system 106 may communicate with each of the two candidate vehicles and provide autonomous vehicle 102a instructions to move to a first location associated with autonomous vehicle 102a and park in a designated orientation. The autonomous vehicle system 106 may communicate with autonomous vehicle 102b and provide it instructions to move to a first location associated with autonomous vehicle 102b and park in the designated orientation. As a result, each of the autonomous vehicles 102 may move to their respective designated locations, and park in the orientations specific to them thus forming a barrier across King Street. The orientation of the autonomous vehicle 102 may be parallel to the flow of traffic, perpendicular to the flow of traffic, or any other orientation that may allow for the autonomous vehicle 102 to form a barrier.

Referring to operation 222, once the event concludes, the autonomous vehicle system 106 instructs the autonomous vehicles 102 that were used to form a barrier to disperse. Referring to operation 224, the autonomous vehicles 102 disperse from their respective first locations. The autonomous vehicles 102 may be instructed to move back to their respective original parking locations. Alternatively, the autonomous vehicles 102 may be instructed to move to locations of other event occurrences or to a location specified by the owner or the autonomous vehicle system 106.

Figure 3:
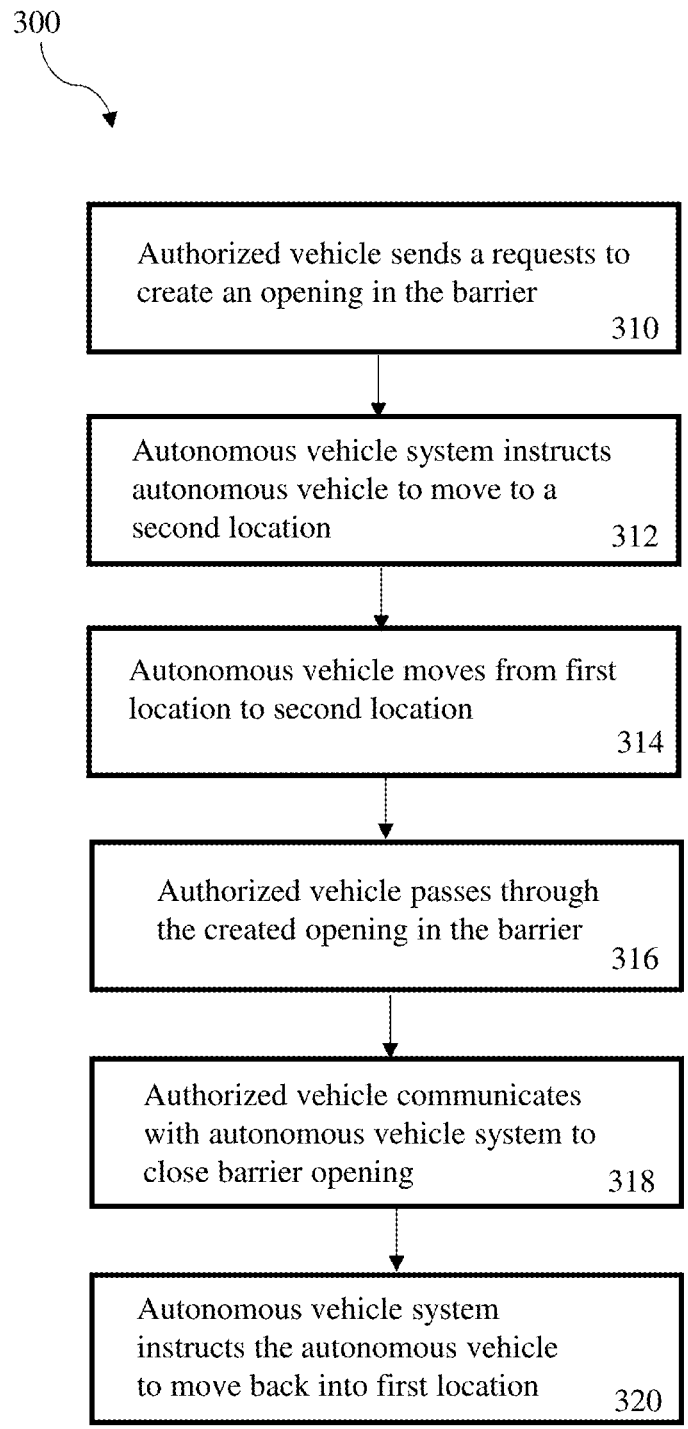
FIG. 3 is a flow chart illustrating an example method for using self-driving autonomous vehicles to form traffic barriers, in accordance with another embodiment of the invention.

Referring to FIG. 3, a method 300 for moving self-driving autonomous vehicles 102 from their barrier location to allow for the passing of authorized vehicles is depicted, in accordance with an embodiment of the present invention.

Referring to operation 310, an authorized vehicle sends a request to the autonomous vehicle system 106 to create a gap in the barrier. The authorized vehicle may be an emergency vehicle such as a police vehicle, an ambulance, a fire truck, or any other vehicle that may be authorized to be present at the event location.

At operation 310, the authorized vehicle may provide the autonomous vehicle system 106 information pertaining to the distance of the authorized vehicle from the event location, the size of the authorized vehicle, the estimated time of arrival of the authorized vehicle, or the direction from which the authorized vehicle may be traveling from. Based on the information provided by the authorized vehicle, the autonomous vehicle system 106 may determine which autonomous vehicle 102 may need to be moved to a second location, to create an opening in the barrier. In an alternative embodiment of the present invention, the authorized vehicle may directly communicate with the autonomous vehicle 102 and provide it instructions to move to the second location.

Referring to operation 312, the autonomous vehicle system 106 instructs the autonomous vehicle 102 to move to the second location.

Referring to operation 314, the autonomous vehicle 102 moves from its first location to its second location. Once the autonomous vehicle 102 moves from its first location, the barrier location, to the second location, an opening in the barrier is created. The second location may be a designated location within the vicinity of the barrier that does not interfere with any activities associated with the event. The second location may be designated by the autonomous vehicle system 106. In an alternative embodiment of the present invention, the second location may be designated by the authorized vehicle or the autonomous vehicle 102 itself.

The autonomous vehicle system 106 may instruct one autonomous vehicle 102 or a plurality of autonomous vehicles 102 to move to their respective second locations. For example, if the barrier is formed using two autonomous vehicles 102, both of which are buses, then the autonomous vehicle system 106 may instruct one of the autonomous vehicles 102 to move to a second location to allow for an authorized vehicle such as a police car to pass through. The opening created by the moving of the one autonomous vehicle 102 bus may be big enough for the police car to pass through. If however, the barrier is created by two autonomous vehicles 102 that are compact cars, the autonomous vehicle system 106 may authorize both of the autonomous vehicles 102 to move to their respective second locations to allow for an authorize vehicle, such as a police car, to pass through.

Referring to operation 316, the authorized vehicle passes through the created opening in the barrier.

Referring to operation 318, once the authorized vehicle passes through the barrier opening, it may communicate with the autonomous vehicle system 106 and instruct it that the barrier opening is no longer needed. The autonomous vehicle system 106 may then, at operation 320, instruct the autonomous vehicle 102 to move back to its first position thereby closing the barrier opening.

Methods 200 and 300 may be more apparent in the schematic block diagrams depicted in FIGS. 4a-d. In FIGS. 4a-d, the autonomous vehicles 102 are illustrated as "cars." Referring to FIG. 4a, a schematic block diagram illustrating an example road intersection is depicted, in accordance with an embodiment of the present invention. The autonomous vehicles 102 are parked along the sides of the road.

Figure 4A:
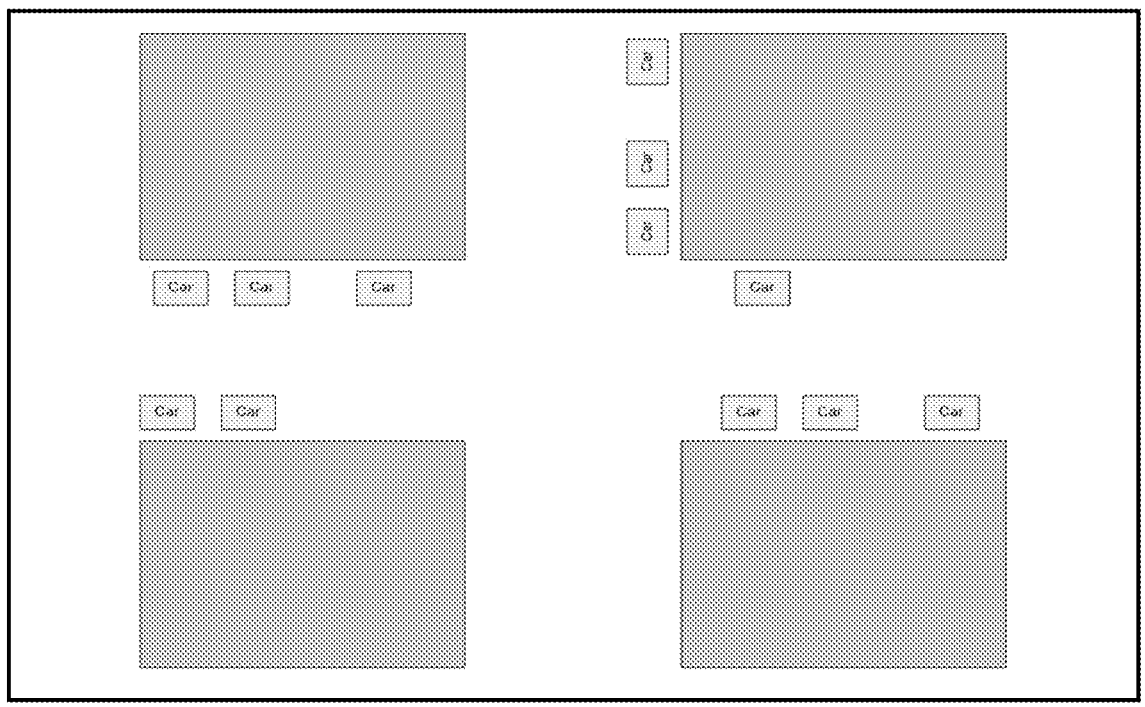
FIG. 4*a* is a schematic block diagram illustrating an example road intersection with self-driving autonomous vehicles parked, in accordance with an embodiment of the present invention.
Figure 4B:
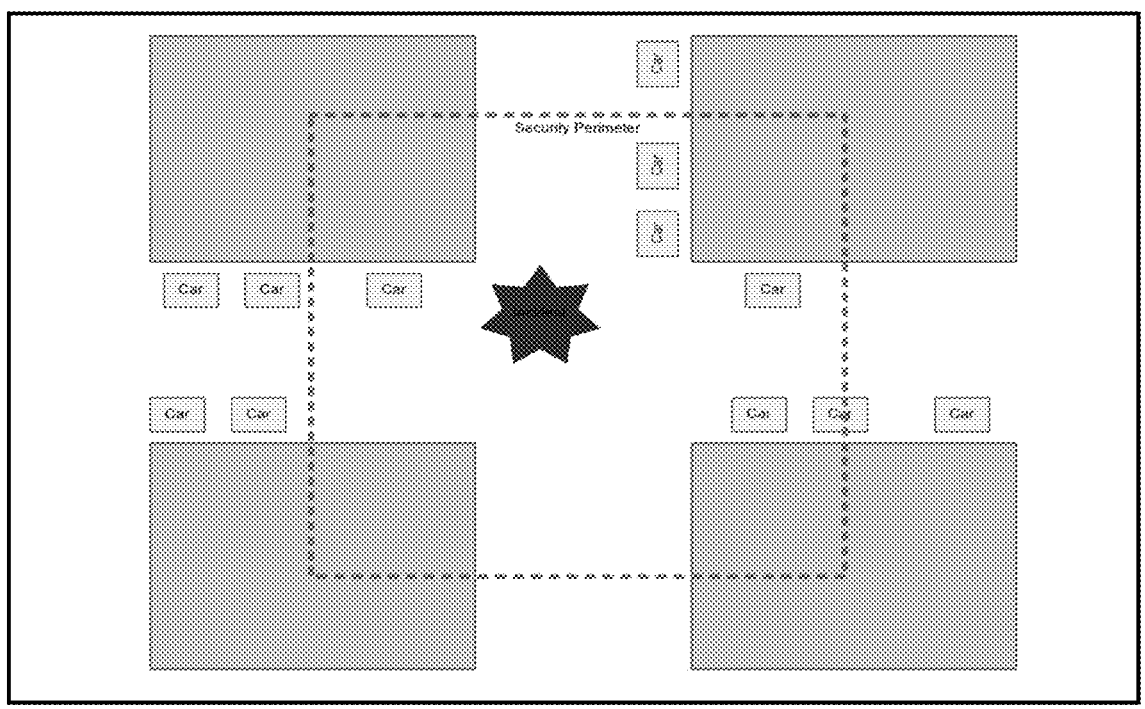
FIG. 4*b* is a schematic block diagram illustrating an example perimeter encompassing the location of an event, in accordance with an embodiment of the invention.

Referring to FIG. 4b, a schematic block diagram illustrating an example perimeter encompassing the location of an event (shown as a star) is depicted, in accordance with an embodiment of the invention. As described herein with reference to FIG. 2, once an event occurs, the autonomous vehicle system 106 may designate a security perimeter (shown as a dashed line) that encompasses the location of the event. As shown in FIG. 4b, the security perimeter may be set at a distance away from the event occurrence.

Figure 4C:
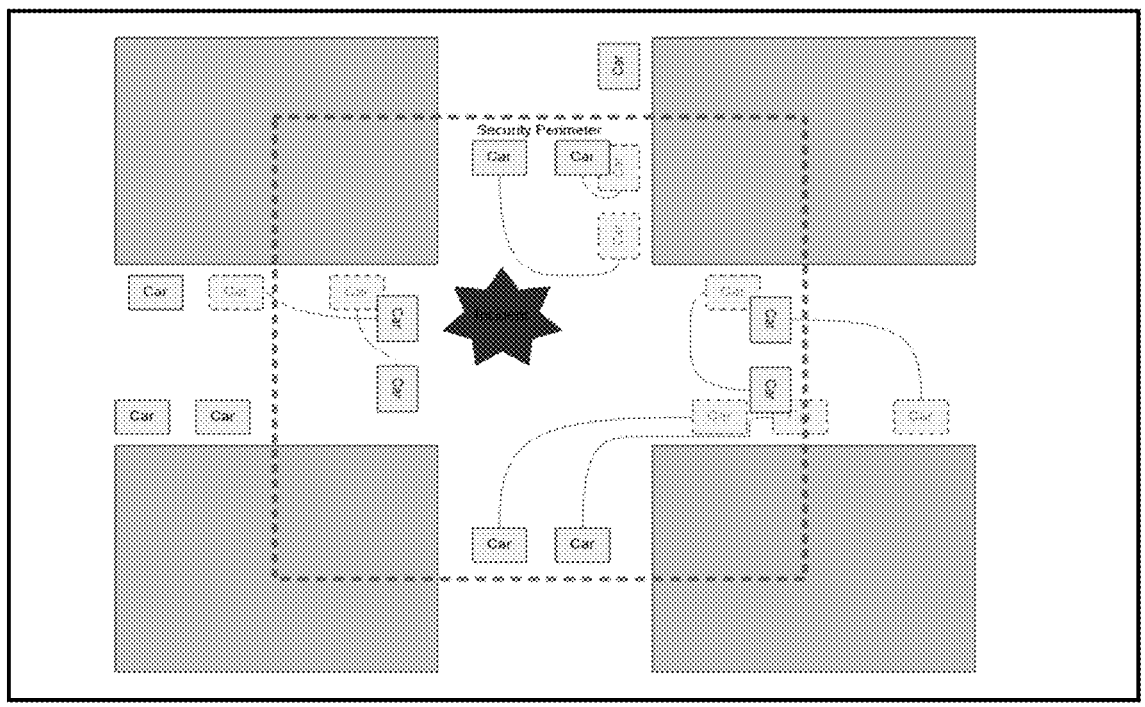
FIG. 4*c* is a schematic block diagram illustrating an example barrier formed by the self-driving autonomous vehicles, in accordance with embodiment of the invention.

Referring to FIG. 4c, a schematic block diagram illustrating an example barrier formed by the autonomous vehicles 102 is depicted, in accordance with an embodiment of the invention. As illustrated in FIG. 4a, there are 12 autonomous vehicles 102 that are in the vicinity of the intersection where the event occurred. As described herein with reference to FIG. 2, the autonomous vehicle system 106 may identify, from the inventory of autonomous vehicles 102, a subset of the set of autonomous vehicles 102 as candidate vehicles that may be used to form the barrier. Each candidate vehicle may be instructed by the autonomous vehicle system 106 to move to a first location specific to that vehicle 102. As is illustrated in FIG. 4c, the candidate vehicles each move from their respective original positions to a first position specific to them to form four barriers along the security perimeter. The four barriers formed each comprise two vehicles. The dashed lines illustrate the original position of the autonomous vehicles 102 whereas the solid lines illustrate the autonomous vehicles' 102 first location specific to them.

Figure 4D:
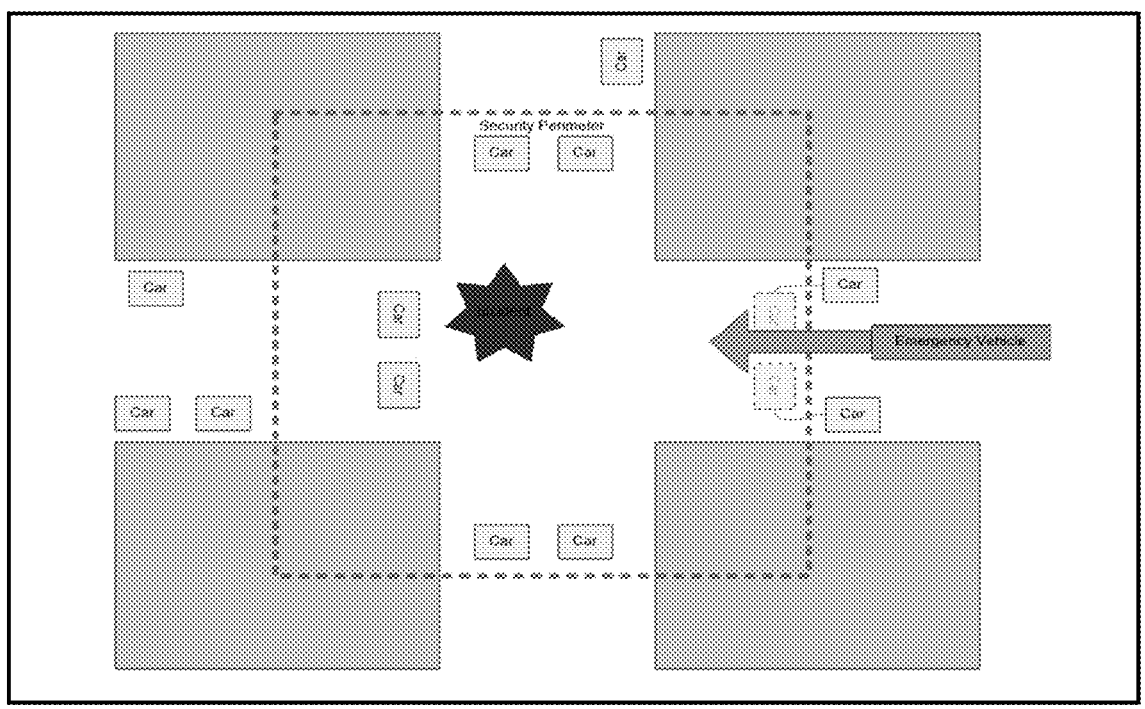
FIG. 4*d* is a schematic block diagram illustrating an example opening in a barrier created by the self-driving autonomous vehicles, in accordance with an embodiment of the invention.

Referring to FIG. 4d, a schematic block diagram illustrating an example creating an opening in a barrier created by the autonomous vehicles 102 is depicted, in accordance with an embodiment of the invention. During an event that is an emergency, such as a road accident, certain authorized vehicles may need to reach the event location. As described in more detail with reference to FIG. 3, once a barrier forms, certain autonomous vehicles 102 may be instructed to move to their respective second locations, thus creating an opening in a barrier, and allowing for authorized vehicles to pass through. FIG. 4d illustrates two autonomous vehicles 102 moving from their respective first locations (shown in dashed lines) to their designated second locations (shown in solid lines) to allow for the authorized emergency vehicle to pass through.

In embodiments of the present invention, described above, the methods 200 and 300 may be executed using the autonomous vehicle system 106. Further, embodiments of the present invention illustrate the utilization of unoccupied autonomous vehicles 102 as barriers. In emergency situations, when access to unoccupied autonomous vehicles 102 is unavailable, the autonomous vehicle system 106 may utilize autonomous vehicles 102 that may be passenger occupied. In such a situation, the autonomous vehicle system 106 may ask the occupants of the identified autonomous vehicles 102 permission to use the vehicles 102. The occupants may accept or decline the request. When the occupants decline the request, the autonomous vehicle system 106 may contact other occupied autonomous vehicles 102 for permission. When the occupants of the autonomous vehicles 102 accept the request, the autonomous vehicle system 106 may prioritize which occupied autonomous vehicles 102 to use first. For example, the autonomous vehicle system 106 may designate autonomous vehicles 102 that may have adult passengers only and omit autonomous vehicles 102 that have children onboard.

Figure 5:
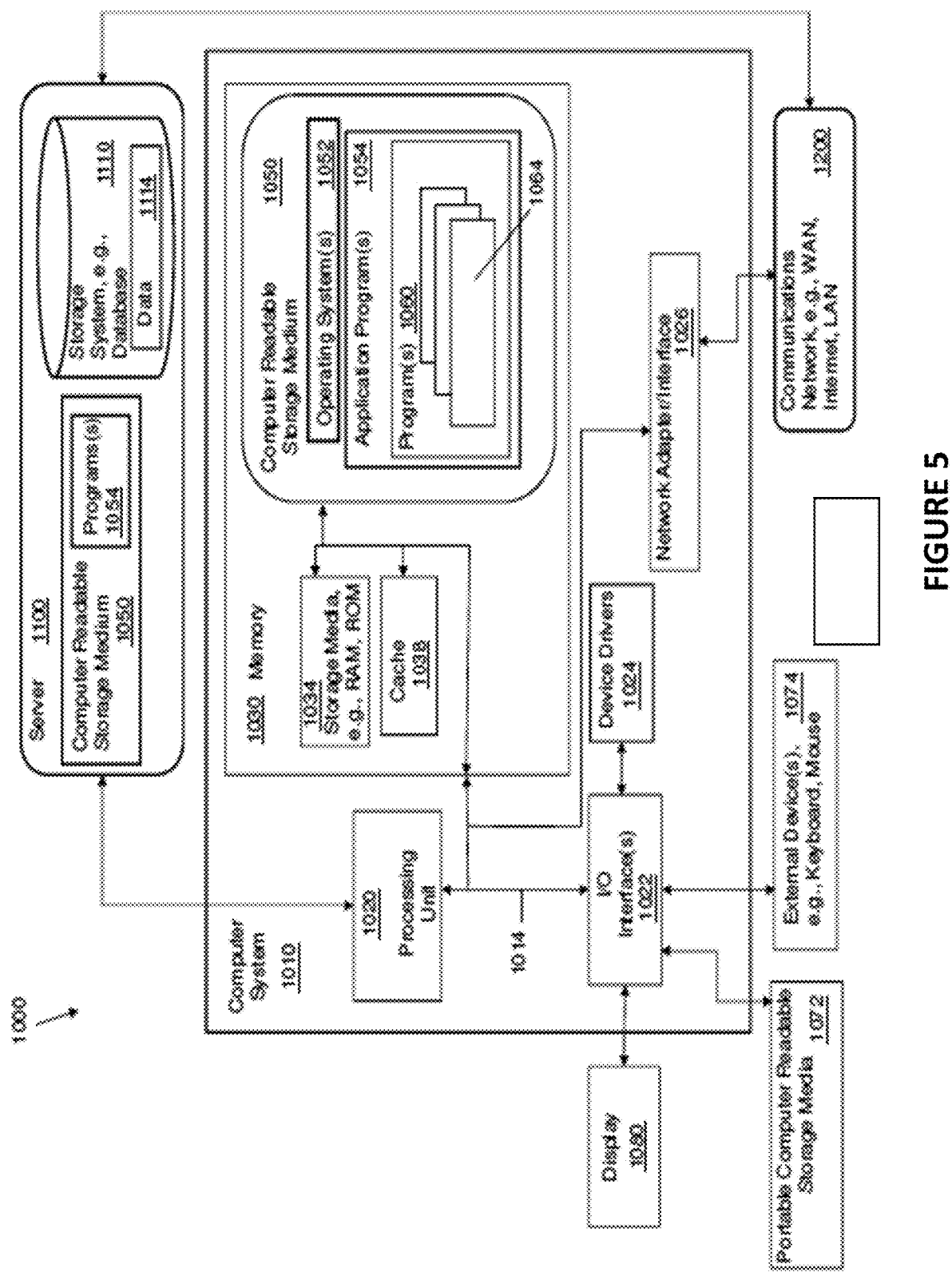
FIG. 5 is a block diagram depicting the hardware components of a system for using self-driving autonomous vehicles to form traffic barriers, in accordance with an embodiment of the invention.

Referring to FIG. 5, a system 1000 includes a computer system or computer 1010 shown in the form of a generic computing device. The methods 200 and 300, for example, may be embodied in a program(s) 1060 (FIG. 5) embodied on a computer readable storage device, for example, generally referred to as memory 1030 and more specifically, computer readable storage medium 1050 as shown in FIG. 5. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 5 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 5 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 5, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The methods 200 and 300 (FIGS. 2 and 3), for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed system and environments have been sequentially or serially identified suing numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
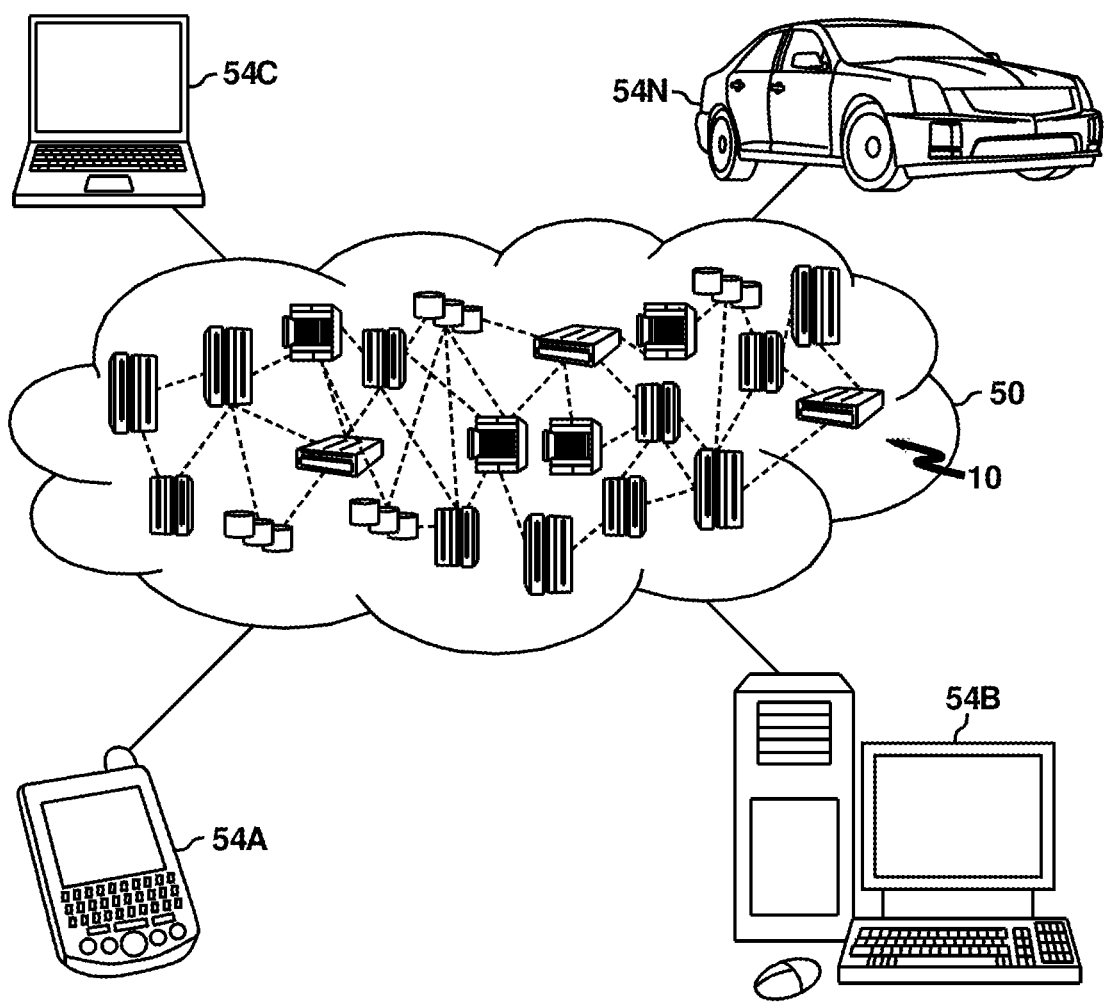
FIG. 6 is a functional block diagram depicting a cloud computing environment, in accordance with an embodiment of the invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
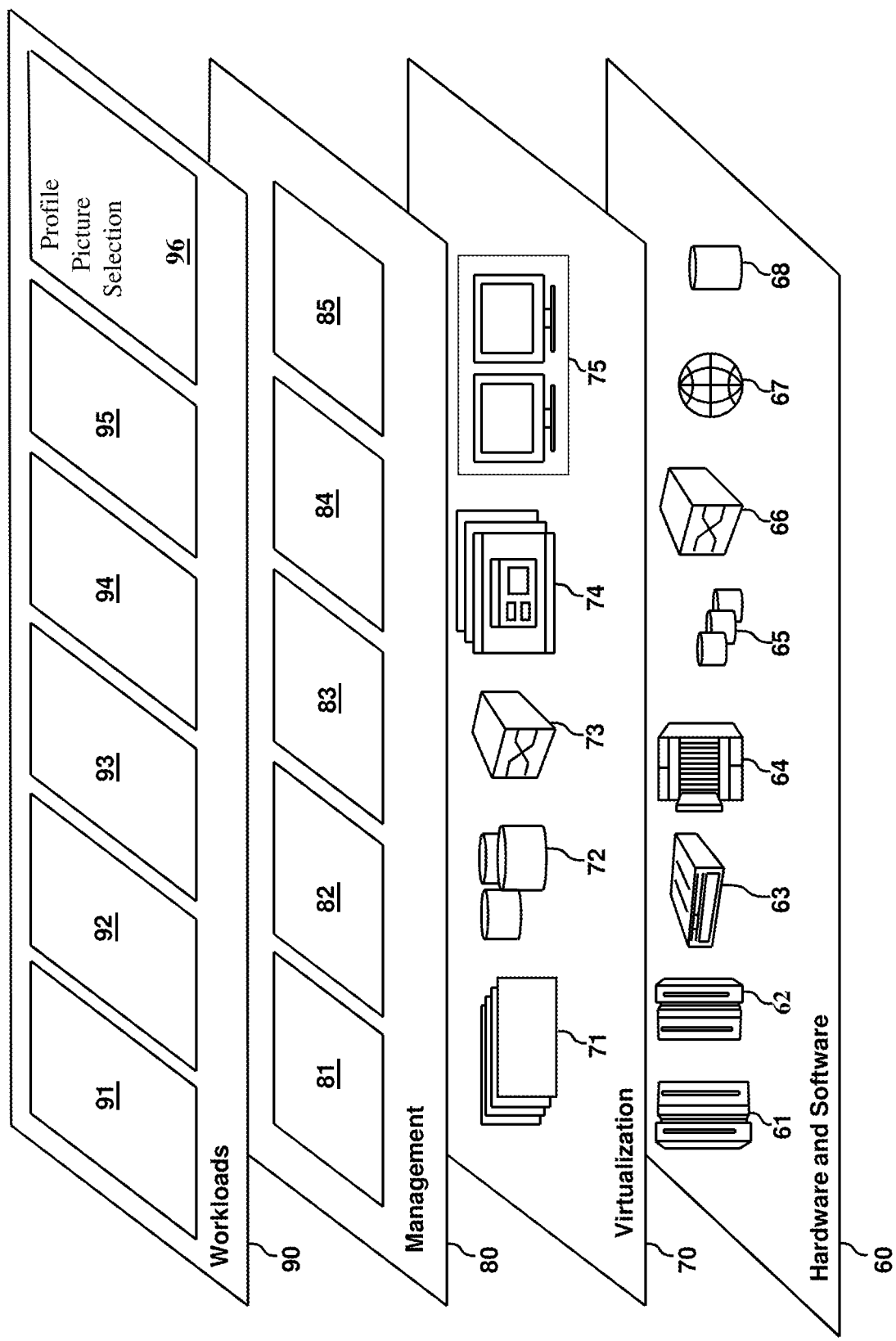
FIG. 7 is a diagram depicting abstraction model layers provided by the cloud computing environment of FIG. 6, in accordance with an embodiment of the invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and instructing to move to a destination 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for using an autonomous vehicle as a barrier, comprising:
   receiving, by a processor, an identification of a location of an event;
   identifying, by the processor, a perimeter encompassing the location of the event;
   identifying, by the processor, an inventory of autonomous vehicles;
   identifying, by the processor, at least one vehicle from the inventory of autonomous vehicles, wherein the identifying is based on one or more criteria; and
   transmitting to the at least one vehicle, by the processor, an instruction to move to a first location.

2. The method of claim 1, wherein the one or more criteria comprises a vehicle location criterion.

3. The method of claim 1, wherein the one or more criteria comprises a vehicle size criterion.

4. The method of claim 1, wherein the one or more criteria comprises a vehicle fuel criterion.

5. The method of claim 1, where in the one or more criteria comprises a vehicle availability criterion.

6. The method of claim 1, further comprising:
   identifying, by the processor, a subset of vehicles in the first location; and
   instructing the subset of vehicles to move to a second location.

7. The method of claim 6, further comprising instructing the subset of vehicles in the second location to move back to the first location.

8. A computer program product for using an autonomous vehicle as a barrier, comprising:
   a computer-readable storage medium having program instructions embodied therewith, the program instructions executable by a computer to cause the computer to perform a method, comprising:
      receiving, by a processor, an identification of a location of an event;
      identifying, by the processor, a perimeter encompassing the location of the event;
      identifying, by the processor, an inventory of autonomous vehicles;
      identifying, by the processor, at least one vehicle from the inventory of autonomous vehicles, wherein the identifying is based on one or more criteria; and
      transmitting to the at least one vehicle, by the processor, an instruction to move to a first location.

9. The computer program product of claim 8, wherein the one or more criteria comprises a vehicle location criterion.

10. The computer program product of claim 8, wherein the one or more criteria comprises a vehicle size criterion.

11. The computer program product of claim 8, further comprising:
    identifying, by the processor, a subset of vehicles in the first location; and
    instructing the subset of vehicle to move to a second location.

12. The computer program product of claim 11, further comprising instructing the subset of vehicles in the second location to move back to the first location.

13. A system for using an autonomous vehicle as a barrier, the system comprising:
    a computer system comprising: a computer processor, a computer-readable storage medium, and program instructions stored on the computer-readable storage medium being executable by the processor, to cause the computer system to perform a method, comprising:
       receiving, by a processor, an identification of a location of an event;
       identifying, by the processor, a perimeter encompassing the location of the event;
       identifying, by the processor, an inventory of autonomous vehicles;
       identifying, by the processor, at least one vehicle from the inventory of autonomous vehicles, wherein the identifying is based on one or more criteria; and
       transmitting to the at least one vehicle, by the processor, an instruction to move to a first location.

14. The system of claim 13, wherein the one or more criteria comprises a vehicle availability criterion.

15. The system of claim 13, wherein the one or more criteria comprises a vehicle fuel criterion.

16. The system of claim 13, further comprising:
   identifying, by the processor, a subset of vehicles in the first location; and
   instructing the subset of vehicle to move to a second location.

17. The system of claim 16, further comprising instructing the subset of vehicles in the second location to move back to the first location.

* * * * *